United States Patent [19]

Che

[11] Patent Number: 4,924,738
[45] Date of Patent: May 15, 1990

[54] BAR PULLER WITH ADJUSTABLE JAW-OPENING

[75] Inventor: Hue N. Che, 5636 Adama St., Los Angeles, Calif. 90042

[73] Assignee: Hue Nguyen Che, Los Angeles, Calif.

[21] Appl. No.: 276,242

[22] Filed: Nov. 25, 1988

[51] Int. Cl.$^5$ .......................... B23B 15/00; B25B 7/02; B25B 18/06

[52] U.S. Cl. .......................... 82/127; 82/162; 269/156; 269/238; 279/1 SG; 279/23 A; 294/100; 294/115

[58] Field of Search ............... 82/124, 126, 127, 162; 269/156, 238; 279/1 SG, 23 R, 23 A, 106; 414/14; 294/99.1, 100, 115

[56] References Cited

U.S. PATENT DOCUMENTS

| | | | |
|---|---|---|---|
| 349,470 | 9/1886 | Wolcott | 279/106 |
| 1,390,961 | 9/1921 | Runge et al. | 279/106 |
| 1,472,714 | 10/1923 | Brown | 294/100 |
| 1,813,695 | 7/1931 | Brockschmidt | 294/115 |
| 1,852,039 | 4/1932 | Bardeen | 294/100 |
| 1,980,465 | 11/1934 | Ackerson | 294/115 |
| 3,175,705 | 3/1965 | Houda | 294/115 |
| 3,370,213 | 1/1968 | Rose | 318/513 |
| 3,678,790 | 7/1972 | Riley | 82/162 |
| 3,736,114 | 5/1973 | Okada | 82/162 |
| 3,981,673 | 9/1976 | Sokolow | 294/115 |
| 4,211,123 | 7/1980 | Mack | 74/99 A |
| 4,522,091 | 6/1985 | Toffolon | 82/162 |
| 4,580,470 | 4/1986 | Buck | 82/124 |
| 4,596,168 | 6/1986 | Buck | 82/124 |
| 4,754,671 | 7/1988 | Toffolon | 82/124 |

Primary Examiner—William Terrell
Attorney, Agent, or Firm—Christie, Parker & Hale

[57] ABSTRACT

A bar puller is provided having adjustable jaws comprising fingers made of a resilient material. The fingers extend forward from a housing adapted to be mounted at a tool station of a computer numerically controlled lathe having a turret. Front and side guiding surfaces are provided on the ends of the fingers to cause the jaws to deflect outwardly and grip a bar when forcibly engaged therewith. The lathe chuck releases the bar allowing the bar puller to withdraw the end of the bar a desired distance out of the chuck. The chuck is closed while the turret continues moving away from the chuck causing the bar to be withdrawn from between the jaws of the bar puller, readying the machine for its next cycle.

6 Claims, 1 Drawing Sheet

BAR PULLER WITH ADJUSTABLE JAW-OPENING

FIELD OF THE INVENTION

The present invention relates generally to field of computer numerically controlled (CNC) machine tools and in particular to a bar puller for a CNC lathe having a turret.

BACKGROUND OF THE INVENTION

CNC machines are becoming ever more widely used for producing machined parts. As a result, numerous tools have been designed for use with CNC machines. Bar pullers are one such type of tool.

Prior art CNC machine bar pullers, such as the bar puller disclosed in United States Pat. No. 4,522,091 to Toffolon have not been easily or fully adjustable. The bar puller in Toffolon uses a pair of toothed jaws for gripping, biased by a pair of coil springs. The jaws are affixed to a rectangular head by screws. The head contains a series of threaded openings to which the jaws may be secured. The opening of the jaws is adjusted in steps by securing the jaws to different threaded openings in the rectangular head. As a result of the incremental size adjustment of the opening only bar stock of compatible sizes may be used.

There exists a need for a bar puller providing easier adjustment of the jaw opening than prior art bar pullers. Such a bar puller should be adjustable without requiring removal from the CNC machine; be continuously variable within the size range of the bar puller, provide a desired gripping force at each size adjustment; offer cross-slide and axial engagement; and have a self centering jaw opening.

SUMMARY OF THE INVENTION

The present invention provides a bar puller comprising a housing having a hollow head and shank portion. The shank portion has a opening at one end and is threaded along a portion of its inner surface. At least two jaws are mounted on the head portion of the puller defining a jaw opening. The jaws each comprise a resilient finger and an adjusting arm. The jaws are pivotally mounted with the fingers projecting forward from the housing. The ends of the fingers turn inward towards the long axis of the housing to provide clearance when gripping the end portion of a bar. The fingers have front and side guiding surfaces at their ends to direct the end of the bar into the jaw opening of the puller. These surfaces provide guiding and spring forces upon abutting engagement with the bar. The guiding forces tend to center the bar between the fingers. The spring forces bias the fingers outward enlarging the opening between the fingers sufficiently to permit the bar to move therebetween. The front guiding surfaces are angled with respect to the motion of the bar along the long axis of the puller. The side guiding surfaces are located at the ends of the front guiding surfaces and are angled with respect to the motion of the bar along the transverse axis of the puller. The adjusting arm of each jaw extends beyond the pivot point of the jaw, at an angle of about 90° to the finger, into the head portion of the housing. A rod is located in the housing which engages the adjusting arm and is used to change the position of the fingers. One end of the rod extends through the open end of the shank portion of the housing. The other end of the rod is located in the head portion of the housing. A groove extends around the circumference of the rod near this end. The groove engages the adjusting arms of the fingers. The rod additionally has a threaded portion which engages the threaded portion of the inside of the housing. When the rod is rotated, the engagement of the housing and rod threads cause axial movement of the rod relative to the housing. This movement is translated to the adjusting arms by the groove in the rod, causing the fingers to rotate on their pivots. Adjustment of the fingers to a desired position may thereby be accomplished. The rod preferably has a slot on its end extending through the housing permitting the rod to be rotated by use of a screwdriver. A locking nut is threaded on the end of the rod extending outside the housing, and is tightened against the end of the housing to prevent the rod from turning during use of the bar puller.

The foregoing and other advantageous and distinguishing features of the invention are described in detail below and are recited in the appended claims.

DETAILED DESCRIPTION

The bar puller of the current invention is used to extract lengths of bar stock from the chuck of a computer numerically controlled (CNC) lathe having a plurality of tool stations mounted on a turret. The tool stations are individually movable towards and away from the bar both by axial movement along the axis of the rotation of the bar and by cross-slide movement in a direction transverse to that axis. To utilize the present invention the bar puller is mounted on a tool station and is forcibly engaged with the residual end of a bar. The bar is extracted a short distance from the chuck then removed from the bar puller as described more fully below.

Figure 1:
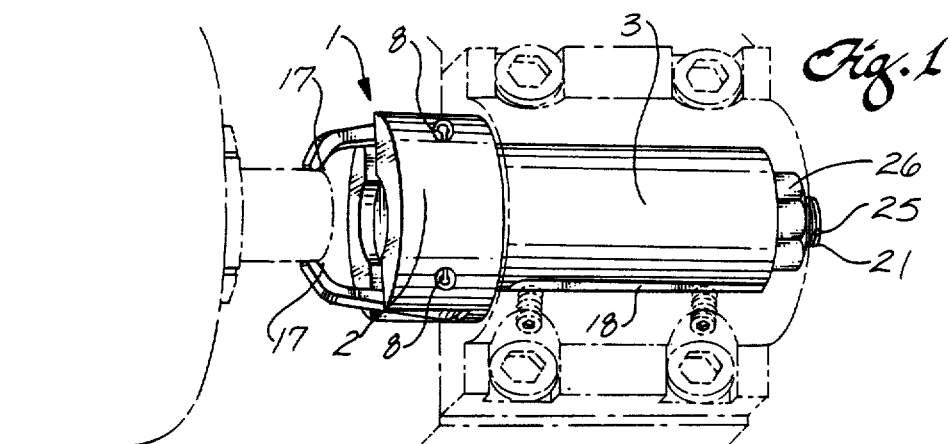
FIG. 1 is a perspective view of a preferred embodiment of the present invention illustrating its use when mounted on an inside-cutting tool position.
Figure 2:
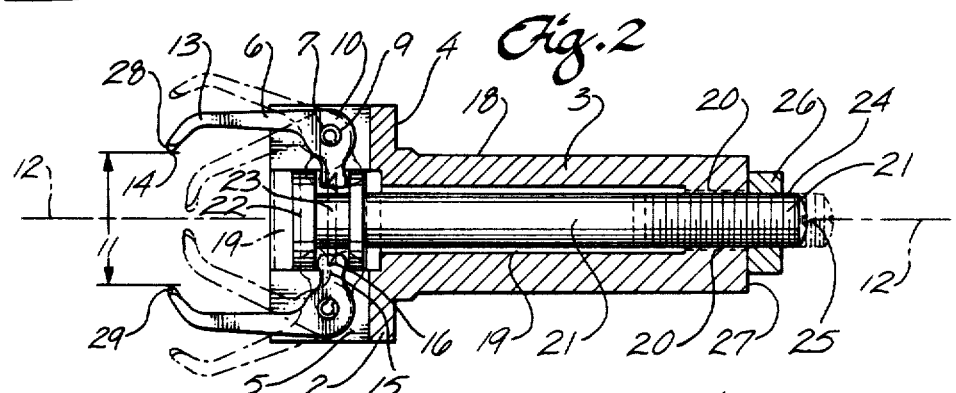
FIG. 2 is a transverse cross-sectional view through the embodiment shown in FIG. 1.

The bar puller comprises a hollow housing 1 having a head portion 2 and a shank portion 3. A shoulder 4 located at the juncture of the head 2 and shank 3 portions provides a stop when the bar puller is mounted on a tool position as shown in FIG. 1. The head portion 2 contains two or more radial slots 5. In each slot a jaw 6 is pivotally mounted by a roll pin 7. As depicted in FIG. 2, the jaws 6 comprise a jaw opening 11 around the long axis 12 of the housing 1. Each roll pin 7 is tightly pressed through a pair of holes 8 located on either side of each slot 5 and is fitted through a hole 9 in each jaw 6. The hole 9 receives the pin 7 as a pivot. The jaws 6 comprise a portion or finger 13 on one side of the hole 9 and an adjusting arm portion 15 on the other side of the hole. The adjusting arm 15 extends outwardly from the portion 10 of the jaw which contains the pivot hole 9, at an angle of about 90° with respect to the finger portion 13 of the jaw. As depicted in FIG. 1, the fingers 13 curve inward towards the long axis of the housing 1 to provide a clearance 17 between the ends and the remainder of the fingers, such that only the ends of the fingers contact a bar when in gripping engagement therewith. The fingers 13 are comprised of a first pair of relatively wider and a second pair of relatively narrower opposing surfaces set perpendicular to each other. The relatively wider opposing surfaces face in the direction of the movement of the fingers 13 defined by the opening and closing of the jaws 6. The relatively narrower pair of opposing surfaces of a thickness which permitting the jaws 6 to be resilient. The jaws 6 are tapered towards their ends to provide additional resiliency in the end portions of the fingers 13 to reduce breakage during use.

As shown in FIG. 1, the housing 1 has two flat surfaces 18 along the side portions of the shank 3 to permit the housing to be secured into a tool position of the lathe of holding screws. The housing 1 is mounted such that the long axis 12 of the housing is aligned with the axis of rotation of the bar.

Figure 3:
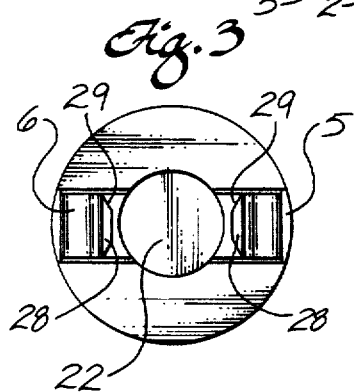
FIG. 3 is a front elevation view of the embodiment shown in FIG. 1.
Figure 4:
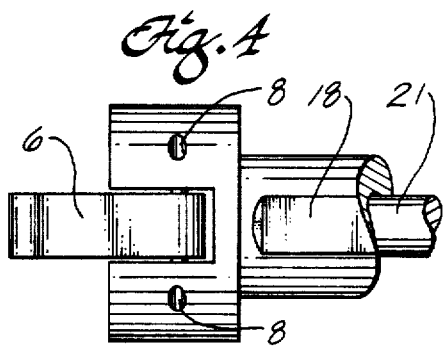
FIG. 4 is a partial side elevation view illustrating details of the head portion of the embodiment shown in FIG. 1.

As may be seen in FIGS. 2 & 3, a hollow 19 extends through the housing 1, centered on the long axis 12. At least a portion of the hollow has threads 20 in the shank 3 near the end opposite to the shoulder 4. The hollow is enlarged in the head portion 2 of the housing. An adjusting rod 21 is located in the hollow 19. The rod 21 has a relatively larger end portion 22 disposed in the head portion of the hollow 19. The larger end portion 22 contains a groove 23 extending circumferentially around it.

The ends 16 of the adjusting arms 15 extend into the groove 23, as shown in FIG. 2. The remainder of the rod 21 extends through the shank 3 protruding from the opening at the end of the shank. The rod 21 has threads 24 near its smaller end. The threads 24 of the rod 21 engage the threads 20 of the shank 3 permitting the rod 21 to be translated along the axis 12 when rotated. The rod 21 has a transverse slot 25 formed in its smaller end to permit its rotation by a screwdriver.

When the rod 21 is rotated, the circumferential groove 23 moves axially within the head 2. The ends 16 of the adjusting arms 15 move along with the groove 23 causing the jaws 6 to rotate about the roll pins 7. This rotation causes movement of the fingers permitting adjustment of the jaw opening 11.

A locking nut 26 is threaded onto the threaded portion of the rod 21 extending outside the shank 3. The nut 26 is secured against end of the shank 27 to fasten the rod 21 in place relative to the housing 1.

The fingers 13 terminate with a gripping-tooth 14 as shown in FIG. 2. As additionally shown in FIG. 5, this tooth 14 is formed by several guiding surfaces 28, 29 on the end of the fingers 13. The surfaces 28, 29 are angled, relative to the motion of the bar puller, when transported by a tool station along the rotational axis of the bar.

Upon abutting engagement of the jaws 6 with the bar, the surfaces 28, 29 direct the end of the bar into the jaw opening 11 of the bar puller. The front guiding surfaces 28 cause the fingers 13 to deflect away from the axis 12 of the housing 1, guiding and centering the bar between the fingers 13, when the jaws 6 engage the bar by movement along the axis of rotation of the bar. The side guiding surfaces 29 causes the fingers 13 to deflect away from the axis 12 of the housing 1, guiding and centering the bar between the fingers 13, when the jaws 6 engage the bar by movement transverse to the axis of rotation of the bar.

In normal operation, the jaw opening 11 is adjusted to a size slightly smaller than the size of the bar. Exemplary jaw openings from 0.002" to 0.06" smaller than the diameter of the bar permit the guiding surfaces 28, 29 to properly engage the bar. This difference between the size of the jaw opening and the diameter of the bar forces the fingers 13 to be deflected outward by the guiding surfaces 28, 29 upon engagement with the bar. The elasticity of the fingers results in a return force being applied by the fingers to the bar. The greater the differential between the size of the bar and the size of the jaw opening, the greater the gripping pressure of the fingers on the bar. After engagement of the bar with the bar puller, the lathe chuck is opened. Movement of the turret withdraws the end of the bar a desired distance out of the chuck exposing a new length of the bar for machining. The chuck is then closed holding the bar in place while the turret returns to its index position. This forcibly withdraws the end of the bar from between the fingers. The CNC machine is then ready for its next cycle.

Figure 5:
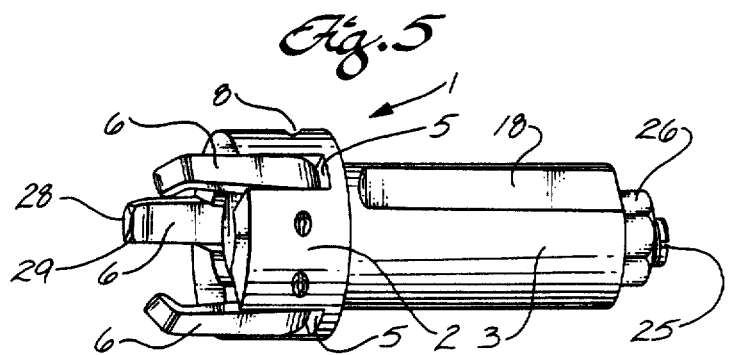
FIG. 5 is a perspective view of a another embodiment of the present invention.

In view of the foregoing description of the invention, those skilled in the relevant arts will have no difficulties making changes and modifications in the different described elements of the invention in order to meet their specific requirements or conditions. For example, a bar puller having more than two jaws may be utilized as shown in FIG. 5. Such changes and modifications may be made with out departing from the scope and spirit of the invention as set forth in the following claims.

I claim:

1. A bar puller for a bar supported for rotation by a numerically controlled lathe having a plurality of tool stations, the tool stations being movable along and transverse to the rotational axis of the bar, the bar puller comprising:

a housing, having a long axis, adapted to be mounted at a tool station;

at least two jaws having resilient fingers, the jaws being pivotally mounted on the housing, the fingers projecting forwardly from the housing, defining a jaw opening, with the ends of the fingers turned inwardly towards the long axis of the housing for gripping engagement with an end portion of the bar;

means for adjusting the jaws to a position wherein the ends of the fingers are disposed in a spaced apart relation to each other a distance slightly smaller than the diameter of the bar, so that the fingers resiliently receive and grip an end portion of the bar when the bar is forcibly inserted therebetween; and the fingers each having guiding means at their ends for providing guiding and flexing forces upon abutting engagement with the bar, the forces respectively tending to center the bar between the fingers and to deflect the ends of the fingers in an outward direction from the bar axis by virtue of resilient flexion of said fingers, permitting the bar to move therebetween, said guiding means being configured to provide said guiding and flexing forces whether said abutting engagement takes place in a direction along or transverse to said along axis.

2. A bar puller for a bar supported for rotation by a numerically controlled lathe having a plurality of tool stations, the tool stations being movable along and transverse to the rotational axis of the bar, the bar puller comprising:

a hollow housing having a long axis adapted to be mounted at a tool station, the housing having a head portion and a shank portion, the shank portion open at one end having threads along at least a portion thereof;

at least two jaws having resilient fingers, the jaws being mounted for pivotal rotation about a point on the head portion of the housing, the fingers projecting forwardly from the housing, thereby defining a jaw opening, and having ends turned inwardly towards the along axis of the housing for gripping engagement with an associated end portion of a bar supported for rotation by the lathe, each jaw additionally having an adjusting arm extending beyond the pivot point of the jaw at an angle of about 90° to the finger, the adjusting arm extending into the head portion of the housing;

means operating the adjusting arms for adjusting the jaws to a position wherein the ends of the fingers are disposed in a spaced apart relation to each other so that the size of the jaw opening is slightly smaller than the size of the bar, so that the fingers resiliently receive and grip an end portion of the bar when the bar is forcibly inserted therebetween; and the fingers each have guiding means at their ends for providing guiding and flexing forces upon abutting engagement with the bar, the forces respectively tending to center the bar between the fingers and to deflect the ends of the fingers in an outward direction from the bar axis by virtue of resilient flexion of said fingers, thereby permitting the bar to move therebetween.

3. The bar puller of claims 1 or 2 wherein the guiding means comprises a front-guiding surface for guiding the bar between the fingers as the bar puller moves towards the bar along the bar rotational axis, the front-guiding surface being angled with respect to said motion of the bar puller providing guiding and flexing forces upon abutting engagement with the bar, the forces respectively tending to center the bar between the fingers and to deflect the fingers outward from the bar permitting the bar to move therebetween.

4. The bar puller of claim 3 wherein the guiding means additionally comprises side-guiding surfaces located adjacent each front-guiding surface, for guiding the bar between the fingers when there is a component of the movement of the bar puller transverse to the rotational axis of the bar, the side-guiding surfaces being angled with respect to said transverse motion of the bar puller providing guiding and flexing forces-upon abutting engagement with the bar, the forces respectively tending to center the bar between the fingers and to deflect the fingers outward from the bar permitting the bar to move therebetween.

5. The bar puller of claim 2 wherein the means for adjusting the jaws comprises:

an adjusting rod having a long axis disposed in the housing, a first threaded end portion of the rod extending through the open end of the shank portion of the housing the threads engaging the threads in the housing, a second end portion of the rod located in the head portion of the housing and having a circumferential groove, the groove engaging the adjusting arms of the jaws whereby rotation of the adjusting rod causes the rod to move along the along axis of the housing through the engagement of the rod threads with the housing threads, thereby causing displacement of the adjusting arms, the adjusting arm displacement causing the jaws to rotate about their pivot points, to permit adjustment of the fingers to a preselected position;

means for rotating the adjusting rod; and a locking nut engageable on the portion of the adjusting rod protruding through the open end of the housing, the nut being tightenable against the open end of the housing for holding the adjusting rod in a preselected position relative to the housing.

6. The bar puller of claim 5 wherein the rod rotating means comprises a slot in the first end of the rod, the slot formed perpendicular to the long axis of the rod such that a screwdriver may be used to rotate the rod.

* * * * *